(12) United States Patent
Kitamura et al.

(10) Patent No.: US 7,422,404 B2
(45) Date of Patent: Sep. 9, 2008

(54) FACILITATED TIGHTENING DEVICE

(75) Inventors: Yoshiharu Kitamura, Komagane (JP);
Takashi Ogino, Komagane (JP);
Yoshihiro Hemmi, Komagane (JP)

(73) Assignee: NHK Spring Co., Ltd. (JP)

( * ) Notice: Subject to any disclaimer, the term of this patent is extended or adjusted under 35 U.S.C. 154(b) by 180 days.

(21) Appl. No.: 11/124,403

(22) Filed: May 9, 2005

(65) Prior Publication Data

US 2005/0276675 A1 Dec. 15, 2005

Related U.S. Application Data

(63) Continuation-in-part of application No. 10/415,553, filed on May 1, 2003, now abandoned.

(51) Int. Cl.
*F16B 39/00* (2006.01)
(52) U.S. Cl. .................. 411/268; 411/267; 411/935
(58) Field of Classification Search ............. 411/433, 411/107, 267, 265, 262, 268–269, 26, 237, 411/263, 259
See application file for complete search history.

(56) References Cited

U.S. PATENT DOCUMENTS

| | | | |
|---|---|---|---|
| 1,344,544 A | 6/1920 | Lorenz | |
| 2,300,228 A | 10/1942 | Kinney | |
| 2,576,579 A | 11/1951 | Donovan | |
| 2,814,325 A | 11/1957 | Shur | |
| 2,935,299 A | 5/1960 | Gerhart | |
| 3,058,386 A | 10/1962 | Morrow | |
| 3,151,652 A | 10/1964 | Zahodiakin | |
| 3,160,187 A * | 12/1964 | Zahofiakin | 411/267 |
| 3,695,139 A | 10/1972 | Howe | |
| 4,083,393 A * | 4/1978 | Okada | 411/267 |
| 4,378,187 A | 3/1983 | Fullerton | |
| 4,974,888 A | 12/1990 | Childers | |
| 5,100,275 A | 3/1992 | Schirrmacher | |
| 5,118,237 A | 6/1992 | Wright | |

(Continued)

FOREIGN PATENT DOCUMENTS

JP 2000-502434 A 2/2000

(Continued)

*Primary Examiner*—Jack W. Lavinder
(74) *Attorney, Agent, or Firm*—Lowe Hauptman Ham & Berner, LLP

(57) ABSTRACT

A facilitated tightening device allowing a bolt to be inserted smoothly by preventing a screw block engaged with the bolt from being inclined or falling down, comprising a base (2) having a bolt-insertion hole (7) partly forming a bolt-receiving face (9) and a slope portion (8) gradually decreasing in radius toward the insertion side of the bolt (6) in a manner so as to match the bolt-insertion hole (7) formed therein, a running screw (3) slid along the slope portion (8) as a result of the axial movement of the inserted bolt (6) to be engaged with the bolt (6), a spring piece (5) that presses the running screw (3) in the downward, in the diameter-reducing direction of the running screw (3), and guide projections (10, 11) that engage with the running screw (3) so as to prevent the screw block (3) from falling down into the base (2). Also, a groove for the running screw 2*b* is formed in the base 2 so as to prevent said running screw 3 from wobbling in the circumferential direction.

9 Claims, 15 Drawing Sheets

U.S. PATENT DOCUMENTS

| | | |
|---|---|---|
| 5,139,381 A | 8/1992 | Lubreski et al. |
| 5,324,150 A | 6/1994 | Fullerton |
| 5,340,252 A | 8/1994 | Weddendorf |
| 5,427,488 A | 6/1995 | Fullerton |
| 6,007,284 A | 12/1999 | Taneichi |
| 6,361,260 B1 | 3/2002 | Schirrmacher |
| 6,684,671 B2 | 2/2004 | Beylotte et al. |

FOREIGN PATENT DOCUMENTS

| | | |
|---|---|---|
| WO | 87/06664 A1 | 11/1987 |

* cited by examiner (a)

(b)

(c)

(a)

(b)

(c)

PRIOR ART

PRIOR ART

FACILITATED TIGHTENING DEVICE

This is a continuation-in-part of application Ser. No. 10/415,553, filed on May 1, 2003, now abandoned.

BACKGROUND OF THE INVENTION

1. Field of the Invention

The present invention relates to a fastening device that can be used in various machines, such as construction, electrical, or mechanical equipment, and that can be inserted and clamped by a one-touch operation.

2. Background of the Invention

Conventionally, there is a fastening device that can be inserted and clamped by one-touch operation; this is described in Japanese Examined Utility Model Publication No. S55-48171. FIGS. 25-27 illustrate this conventional fastening device 100, which comprises a base 110, running screws 120, 120, and a spring 130 consisting of a coil spring.

A bolt 140 is inserted into the base 110, and a bolt-insertion hole 150 is opened in the base 110. The bolt-insertion hole 150 that is formed in the base 110 has slope portions 160, 160. The radius of the lower parts of the slope portions 160, 160 of the bolt-insertion hole 150 is made smaller than the radius of the upper part of the slope portions 160, 160 of the bolt-insertion hole 150, and the running screws 120, 120 are supported on the slope portions 160, 160, respectively.

The running screws 120, 120 are opposed to each other in a pair, and female screws 121, 121 that are to be engaged with male screws 141, 141 of the bolts 140, 140 are formed in a longitudinal direction on the opposed faces of the running screws 120, 120. In addition, tapered faces 122, 122 that can freely slide on the above-mentioned slope portions 160, 160 are formed at the bottom of the running screws 120, 120.

A spring 130 is inserted into the base 110 in a manner so as to apply pressure to a pair of the opposed running screws 120, 120 from above. In order that the spring 130 can press the running screws 120, 120, a cover 170 is fixed on the top end of the base 110 by pressure fitting.

In such a structure, by mounting the cover 170 onto the base 110 with the spring 130 flexed to some degree, the running screws 120, 120 are pressed to move toward the bolt-insertion hole 150. As shown in FIG. 26, the bolt 140 is inserted in the base 110 from the bolt-insertion hole 150, so that the running screws 120, 120 slide upward on the slope portions 160, 160 against the spring force of the spring 130, and thus the bolt can be inserted between the running screws 120, 120. Then, the female screws 121, 121 of the running screws 120, 120 engage with the bolt 140 due to the spring force of the spring 130, and thus the bolt 140 can be fastened by a one-touch operation.

However, this conventional fastening device 100 has a shortcoming that the insertion of the bolt 140 can cause the running screws 120, 120 to become inclined or to slip down in the base 110. FIG. 27 shows such a situation where the running screws 120, 120 slip down. When the inserted bolt 140 pushes up the running screws 120, 120, the top portions of the running screws 120, 120 are inclined in a manner so as to approach or lean toward each other (as shown by the arrows), or to slip down. Such a displacement causes the bolt 140 to be hooked by the running screws 120, 120 when the bolt 140 is inserted, which hinders the bolt 140 from being inserted by a one-touch operation.

The present invention has been made in consideration of the above problems with a conventional fastening device, and one object of the present invention is to provide a fastening device that makes it possible to smoothly insert a bolt while preventing the inclination or slipping down of the running screws at the time that the bolt is inserted, and thereby makes it possible to perform fastening by a one-touch operation.

SUMMARY OF THE INVENTION

The present invention is a fastening device, which has a structure such that running screws are slideably assembled in a base and pressed downward, in the diameter-reducing direction of the running screw by a pressing means, and such that the insertion of bolts in the base causes the running screws to move upward, in the diameter-enlarging direction of the running screw and then to engage with the bolts.

There is formed on the base a slope portion whose radius is gradually reduced toward the bolt-insertion face, and a means for guiding the running screw that has (1) an inclined portion that is inclined in the same direction as the slope portion of the base, and (2) an engagement portion that can engage with the inclined portion is formed opposite to the running screws and the cover. Due to the thus-formed means for guiding the running screw, the running screws are prevented from inclining or slipping down when bolts are inserted in the base and the running screws move upward, in the diameter-enlarging direction of the running screw. Accordingly, the running screws do not interfere with the bolts at the time of insertion of the bolts, and the bolts can be smoothly inserted into the base.

Furthermore, according to the structure of the present invention, a groove for the running screw, in which the running screw is slideably inserted, is formed on the base, and the groove for the running screw supports both of the two lateral faces of the running screw, so that the running screw is prevented from wobbling in the circumferential direction. In this structure, whereby wobbling in the circumferential direction of the running screws is prevented, the running screws can even more smoothly engage with the bolts.

BRIEF DESCRIPTION OF THE DRAWINGS

FIG. 19(a) is a plan view thereof, and FIG. 19(b) is a cross-sectional view thereof, taken along line E-E.

FIG. 20(a) is a plain view thereof, and FIG. 20(b) is a cross sectional view thereof, taken along line F-F.

DESCRIPTION OF THE PREFERRED EMBODIMENTS

Embodiments illustrating the present invention will be described in detail as follows. In each embodiment, the same reference number is used to refer to a given part that is found in one or more of the embodiments.

Embodiment 1

Figure 1:
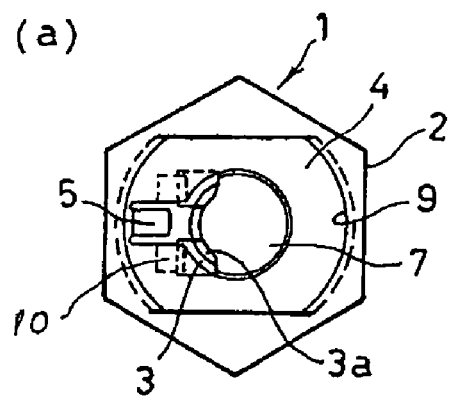
FIG. 1 illustrates Embodiment 1 of the present invention, a plan view of which is shown by (a), a vertical cross-sectional view of which is shown by (b), and a bottom view of which is shown by (c).
Figure 1:
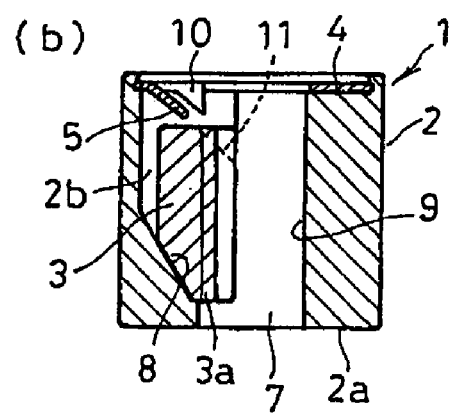
Figure 1:
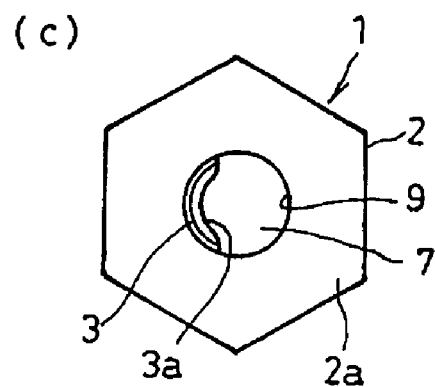

FIGS. 1-9 illustrate Embodiment 1 of the present invention and, as shown by FIG. 1, a fastening device 1 includes a base 2, a running screw 3, a cover 4, and a spring piece 5.

Figure 2:
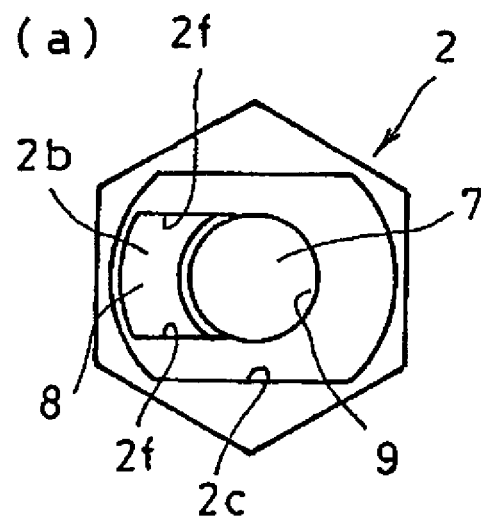
FIG. 2(*a*) is a plan view of a base of the present invention, and FIG. 2(*b*) is a vertical cross-sectional view thereof.
Figure 2:
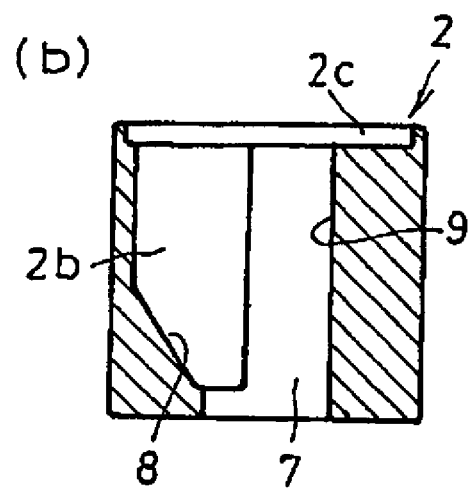

A bolt 6 (FIGS. 5-9) is inserted into the base 2, and a bolt-insertion hole 7 penetrates through the base in the axial direction, as shown by FIG. 2. A bolt-insertion face, into which the bolt 6 is inserted, is illustrated as 2a in FIG. 1. A groove for the running screw 2b is formed inside the base 2. The groove for the running screw 2b is designed in such a manner that a running screw 3, described below, moves therein, and the groove for the running screw 2b is formed in such a way that the diameter of the bolt-insertion hole 7 varies in a prescribed way. A slope portion 8 is formed on the side of the bolt-insertion face 2a of the groove for the running screw 2b.

The slope portion 8 is formed into a conical shape whose radius is gradually reduced toward the bolt-insertion face 2a, in a manner so as to match the bolt-insertion hole 7. The slope portion 8 supports the running screw 3 in such a way that the running screw 3 can slide, and the slope portion 8 is formed into a shape that fits along the outer profile of the running screw 3. Accordingly, when the running screw 3 moves along the slope portion 8, a female screw 3a (which will be described later and which is shown in FIGS. 1(a), (b), and (c) and in FIGS. 3(b), (c), and (d)) of the running screw 3 that engages with the outer surface of the bolt 6 moves in a horizontal direction.

In this embodiment, the inner face of the bolt-insertion hole 7, which is opposed to the groove for the running screw 2b (the running screw 3), is an arc-shaped bolt-receiving face 9 having approximately the same curvature as that of the bolt 6. The bolt-receiving face 9 receives the reaction force generated when the running screw 3 is engaged with the bolt 6, thereby securely fastening the bolt 6.

A cover-attaching concavity 2c is formed on the end face of the base 2 on the opposite side of the bolt-insertion face 2a. The cover-attaching concavity 2c is formed in a noncircular shape and, in this embodiment, it is formed into a noncircular shape with parallel cuts on two sides. Furthermore, the base 2 in this embodiment is molded so as to have a hexagonal nut-like outer profile, but it is not limited to this shape, and it can also be formed into other shapes.

Figure 3:
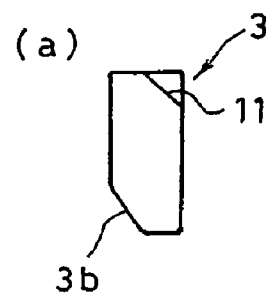
FIG. 3(*a*) is a front view of a running screw, FIG. 3(*b*) is a plan view thereof, FIG. 3(*c*) is a vertical cross-sectional view thereof, and FIG. 3(*d*) is a bottom view thereof.
Figure 3:
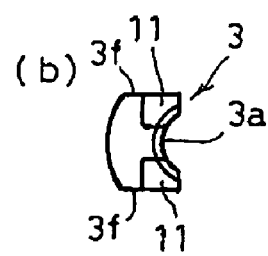
Figure 3:
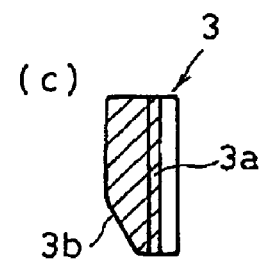
Figure 3:
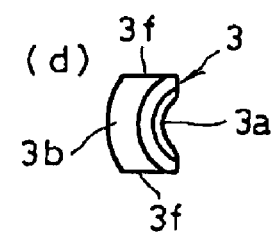

As shown in FIG. 3, the running screw 3 has a split shape that is obtained by splitting a circular column into plural pieces along its diameter. As a result of such splitting, as shown in FIGS. 3(b) and 3(d), both of the right and left side faces 3f, 3f of the running screw 3 are symmetrical and parallel to the diameter-direction of the circular column. Also, the pair of the side faces 3f, 3f extend in the vertical direction, i.e., the insertion direction of the bolt 6. On the surface—of the running screw 3—that is opposed to the bolt-receiving face 9 of the bolt-insertion hole 7, there is formed a female screw 3a that engages with a male screw 6a on the outer surface of the bolt 6. Also, a slide face 3b, which is formed into a conical tapered shape and which slides on the slope portion 8, is formed at the bottom of the running screw 3. In this embodiment, one running screw 3 is used, and it is inserted in the base 2 in a manner so that the female screw 3a of the running screw 3 is opposed to the bolt-receiving face 9, in order to fasten the bolt 6 between the running screw 3 and the bolt-receiving face 9.

The above-mentioned grooves 2b for the running screw 3 of the base 2 are formed into female-screw-shaped grooves that correspond to the outer shape of the running screw 3. Therefore, the grooves 2b for running screw 3 have a pair of sidewalls 2f, 2f that are opposed to the pair of the side faces 3f, 3f of the running screw 3. The pair of the sidewalls 2f, 2f are formed so as to extend in parallel to the pair of the side faces 3f, 3f of the running screw 3, and in the vertical direction, i.e., the insertion direction of the bolt 6. As a result, the entire surfaces of the side faces 2f, 2f of the groove 2b for running screw are opposed to the side faces 3f, 3f of the running screw 3. The sidewalls 2f, 2f of the grooves 2b for the running screw 3 slideably receive the side faces 3f, 3f of the running screw 3 in a slideable manner, and thereby prevent the running screw 3 from wobbling in the circumferential direction. Thereby, the running screw 3 can be smoothly engaged with the bolt 6.

Figure 4:
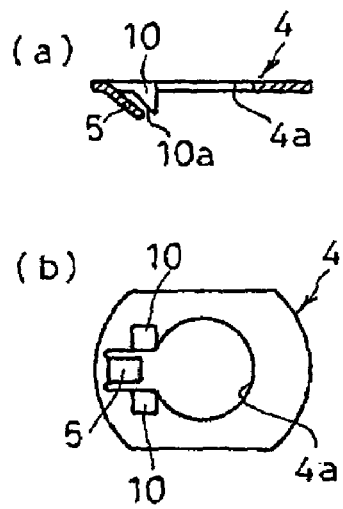
FIG. 4(*a*) is a vertical cross-sectional view of a cover, and FIG. 4(*b*) is a plan view thereof.

The cover 4 is fit into the cover-attaching concavity 2c of the base 2 so as to close the face that is opposite to the bolt-insertion face 2a of the base 2. The cover 4, as shown in FIG. 4, is formed into a noncircular outer profile that is similar to that of the cover-attaching concavity 2c, and an insertion hole 4a, through which the bolt 6 penetrates, is formed at the center of the cover 4. After the cover 4 is fit into the cover-attaching concavity 2c of the base 2, the cover 4 clamps the end face of the base 2 and is thereby affixed to the base 2.

One part of the cover 4 is bent toward the side of the base 2, so that elasticity is given to the spring piece 5. The spring piece 5 acts as a pressing means for pressing the running screw 3, which is inserted in the base 2, downward. Thus, the spring piece 5 is integrated with the cover 4, and the number of parts that constitute a fastening device is reduced, resulting in easy assembly, which is advantageous.

Means for guiding the running screw for preventing the running screw 3 from slipping down are formed on the running screw 3 and the cover 4. The means for guiding the running screw comprise an inclined portion and an engagement portion that are formed so as to correspond to the running screw 3 and the cover 4. In this embodiment, the inclined portion comprises a guide groove 11 that is formed on the running screws 3, as shown in FIG. 3, and the engagement portion comprises a guide projection 10 that is formed on the cover 4, as shown in FIG. 4.

Guide grooves 11 as inclined portions are positioned on both sides of the top face of the running screw 3. The guide grooves 11 are inclined in the same direction as the slope portion 8 of the above-mentioned base 2. Guide projections 10 as engagement portions projects from both sides of the spring piece 5 toward the base 2 (namely, toward the insertion side of the bolt 6), and face the guide grooves 11 of the running screw 3. Guide faces 10a, which are inclined in the same direction as the slope of the base 2 (inclined similarly to the guide grooves 11), are formed at positions in the projection 10 so that the guide faces 10a face the guide grooves 11.

In the thus-constituted means for guiding the running screw, when the bolt 6 is inserted in the base 2 to push up the running screws 3, the guide grooves 11 of the running screws 3 engage with the guide faces 10a of the guide projections 10. This engagement prevents the running screws 3 from slipping toward the bolt-insertion hole 7.

Figure 5:
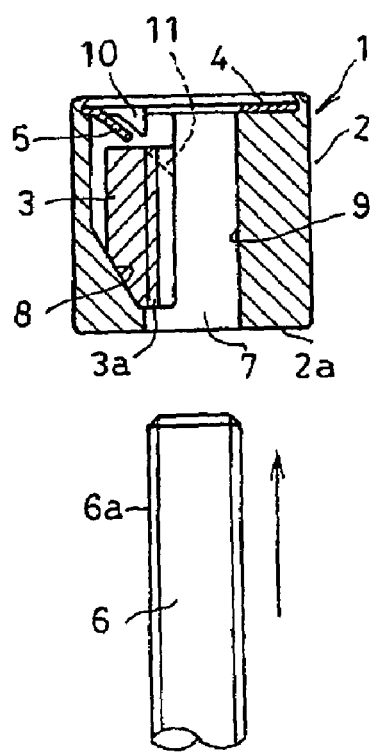
FIG. 5 is a cross-sectional view showing the condition before a bolt is inserted in Embodiment 1.

FIGS. 5-9 illustrate the action of this embodiment. As shown in FIG. 5, a running screw 3 is inserted into the groove for the running screw 2b of the base 2 in a manner so that a female screw 3a is opposed to the bolt-receiving face 9 of the bolt-insertion hole 7. By this insertion, the sidewalls 2f, 2f of the grooves for the running screws 2b of the base 2 are opposed to the two side faces 3f, 3f of the running screw 3, and the side faces 3f of the running screw 3 is supported in the grooves for the running screws 2b, so that the running screw 3 is prevented from wobbling in the circumferential direction. In addition, under a free condition that the bolt is not fastened, the running screw 3 is supported by the slope portion 8. Under such a supported condition, both ends of the running screw 3, which are perpendicular to the axial direction of the running screw 3, are brought into contact with and fastened to the inner face of the base 2, and thus the running screw 3 is prevented from falling out of the base 2. In addition, both ends of the running screw 3, which are perpendicular to the axial direction of the running screw 3, protrude inside the bolt-insertion hole 7 (see FIG. 1).

Figure 6:
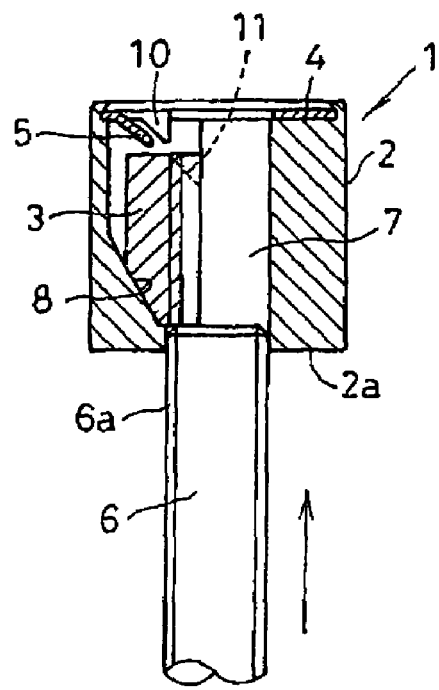
FIG. 6 is a cross-sectional view showing a condition when a bolt is about to be inserted in Embodiment 1.
Figure 7:
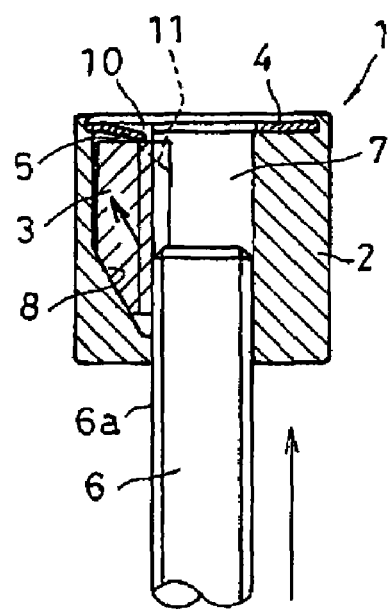
FIG. 7 is a cross-sectional view showing the condition when a bolt is being inserted in Embodiment 1.

The bolt 6 is formed in an upright fashion from an unfastened member (not shown), and when the fastening device 1 is made to approach the bolt 6, the bolt 6 is inserted into the bolt-insertion hole 7 of the base 2 from the side of the bolt-insertion face 2a. As shown in FIG. 6, due to this insertion, the bolt 6 pushes up the running screw 3. Due to this pushing up, and as shown in FIG. 7, the running screw 3 slides upwards along the slope portion 8, in the diameter-enlarging direction of the running screw 3.

As a result of this movement upward, the guide projections 10 of the cover 4 are engaged with the guide grooves 11 of the running screw 3. The guide face 10a of the guide projection 10 slides in the guide groove 11 so as to achieve such an engagement. The guide grooves 11 are inclined in the same direction as the slope portion 8 of the base 2, so that the guide projection 10 prevents displacement of the running screw 3, namely from slipping down or being inclined, toward the bolt-insertion hole 7. As a result, the bolt 6 is smoothly inserted in the base 2 without being hooked by the running screw 3. In this embodiment, guide grooves 11 are formed on both sides of the running screw 3, and engaged with the guide projections 10, respectively, so that the running screw 3 can be prevented from slipping down or being inclined.

Figure 8:
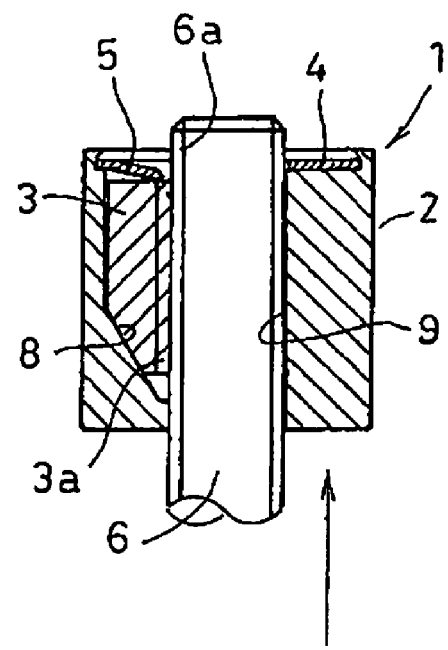
FIG. 8 is a cross-sectional view showing the condition after a bolt has been inserted in Embodiment 1.
Figure 9:
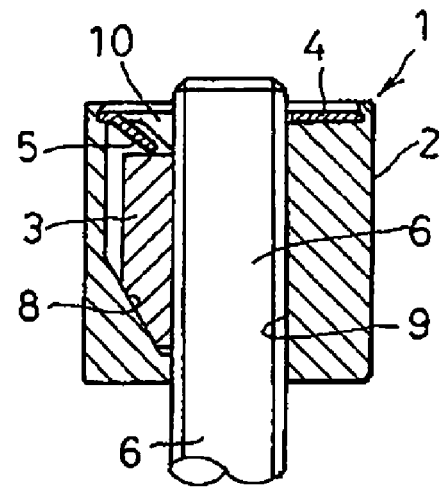
FIG. 9 is a cross-sectional view showing the condition when the running screw is engaged with the bolt of Embodiment 1.

FIG. 8 illustrates the condition after the bolt 6 has been inserted into the base 2, in which the spring piece 5 of the cover 4 elastically presses the top end of the running screw 3 and presses the running screw 3 downward. Due to this pressing, the running screw 3 moves downward along the slope portion 8, and the female screw 3a is engaged with the male screw 6a of the bolt 6. Due to this engagement, the bolt 6 is bought into contact with the bolt-receiving face 9 of the bolt-insertion hole 7, and the bolt-receiving face 9 receives the reaction force of the engagement. As a result, the running screw 3 can fasten the bolt 6 without loosening. FIG. 9 illustrates the condition when the inserted bolt 6 has been returned slightly downward, and the female screw 3a of the running screw 3 is engaged with the male screw 6a of the bolt 6.

In such an embodiment, the guide projections 10, which constitute a means for guiding the running screw, and the guide grooves 11 are engaged with each other so as to prevent slipping down or inclination of the running screw 3, and thus the bolt 6 can be smoothly inserted without being hooked by the running screw 3. Also, because the grooves for the running screws 2b of the base 2 prevent the running screw 3 from wobbling in the circumferential direction, the running screws 3 mesh even more smoothly with the bolts 6. Thereby, fastening can be surely performed by one-touch insertion. Also, in this embodiment, because the spring piece 5 is integrated with the cover 4, the number of parts can be reduced, and the entire axial length of the device can be shortened.

Embodiment 2

Figure 10:
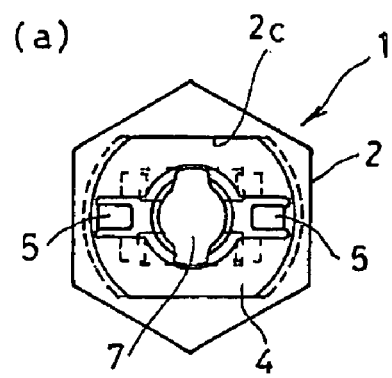
FIG. 10 illustrates Embodiment 2 of the present invention, a plan view of which is shown by (a), a vertical cross-sectional view of which is shown by (b), and a bottom view of which is shown by (c).
Figure 10:
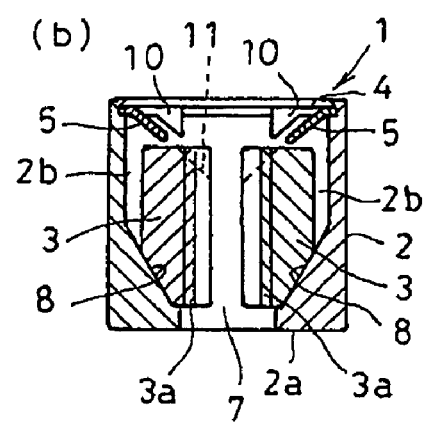
Figure 10:
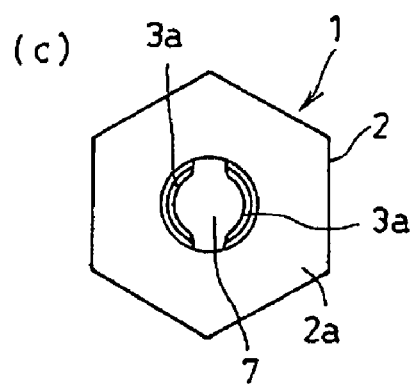
Figure 11:
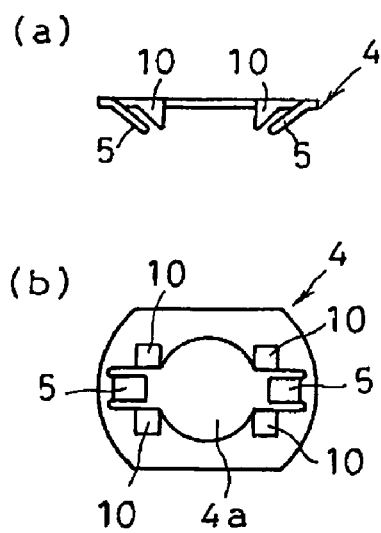
FIG. 11 (*a*) is a vertical cross-sectional view of a cover in Embodiment 2, and FIG. 11 (*b*) is a plan view thereof.

FIGS. 10 and 11 illustrate Embodiment 2 of the present invention. In this embodiment, as shown in FIG. 10(b), a groove for the running screw 2b, which has a slope portion 8, is formed opposite each side of the bolt-insertion hole 7. Though not shown, a pair of side faces 3f, 3f extending parallelly in the vertical direction are formed on both right and left sides of the running screws 3. Also, a pair of sidewalls 2f, 2f extending parallelly in the vertical direction are formed on the groove 2b for running screw, and the sidewalls 2f, 2f receive the side faces 3f, 3f of the running screws 3. Thus the grooves for the running screws 2b prevent the running screws 3 from wobbling in the circumferential direction. Furthermore, the pair of running screws 3 are supported by the slope portions 8 in such a way that the running screws 3 face each other, and the pair of running screws 3 are inserted in the grooves for the running screws 2b of the base 2 in such a way that the female screws 3a face each other.

Guide grooves 11 are formed on the top faces of the running screws 3 and the guide projections 10 to be engaged with the guide grooves 11 are formed on the cover 4 in such a way that the number of the guide projections 10 equals the number of running screws 3. (see FIG. 11) Furthermore, the spring pieces 5 for pressing each of the running screws 3 downward are formed at positions of the cover 4 that correspond to the running screws 3.

In this embodiment, when the bolt 6 is inserted in the bolt-insertion hole 7 from the side of the bolt-insertion face 2a, a pair of the running screws 3 move upward along the slope portion 8. Due to this movement, the guide projections 10 are engaged with the guide grooves 11 of the running screws 3. As a result, the running screws 3 can be prevented from inclining or slipping down, and the bolt 6 can be smoothly inserted. After the bolt 6 is inserted, the pair of running screws 3 are pressed by the spring pieces 5, and thus the running screws 3 are engaged with the bolt 6 in such a way that the running screws 3 clamp the bolt 6 from both sides of the bolt 6. Thereby, the force for fastening the bolt 6 becomes large, so that the bolt 6 can be stably fastened.

Embodiment 3

FIGS. 12-16 illustrate Embodiment 3 of the present invention. In this embodiment, a spring-accommodating groove 12 is formed at the end opposite to the bolt-insertion face 2a of the base 2. The spring-accommodating groove 12 is formed so as to have a predetermined length in the axial direction of the base 2, so that a coil spring 13 can be partially inserted therein.

Because the coil spring 13 is inserted into the spring-accommodating groove 12, one part of the coil spring 13 is positioned in the groove for the running screw 2b of the base 2, and thus the coil spring 13 presses the running screws 3, which are inserted in the grooves 2b, downward. Accordingly, in this embodiment, a spring piece 5 is not formed on the cover 4, and therefore the shape of the cover 4 is simple.

Guide projections 10, which are to be engaged with the guide grooves 11 of the running screws 3, are formed on the cover 4. The guide projections 10 project from the cover 4 in an upright fashion on the bolt-insertion face 2a of the base 2, in the condition that a guide projection 10 has a guide face 10a so as to be engaged with the guide groove 11 of the running screw 3.

Also in this embodiment, although not shown, the sidewalls 2f that support the side faces 3f of the running screws 3 are formed on the grooves for the running screws 2b of the base 2, into which the running screws 3 are inserted, thereby preventing the running screws 3 from wobbling in the circumferential direction.

Figure 12:
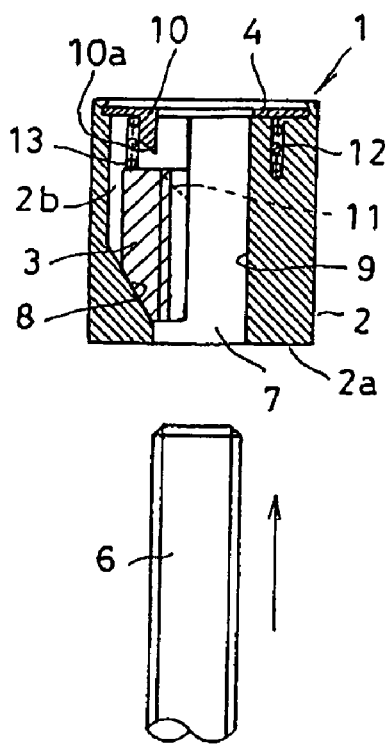
FIG. 12 is a cross-sectional view showing the condition before a bolt is inserted in Embodiment 3.
Figure 13:
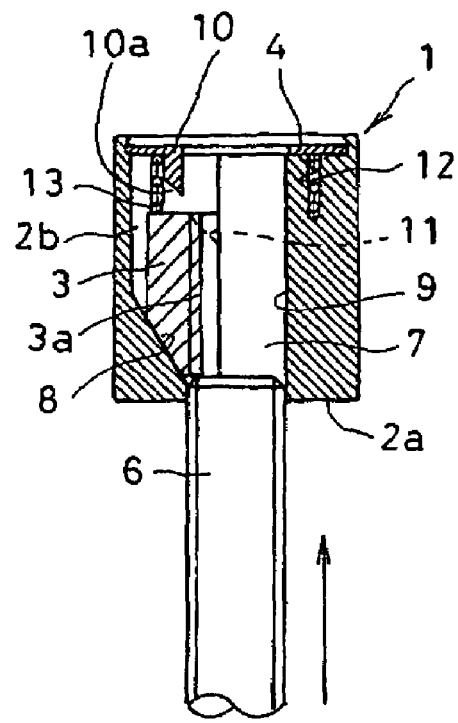
FIG. 13 is a cross-sectional view showing the condition when a bolt is about to be inserted in Embodiment 3.
Figure 14:
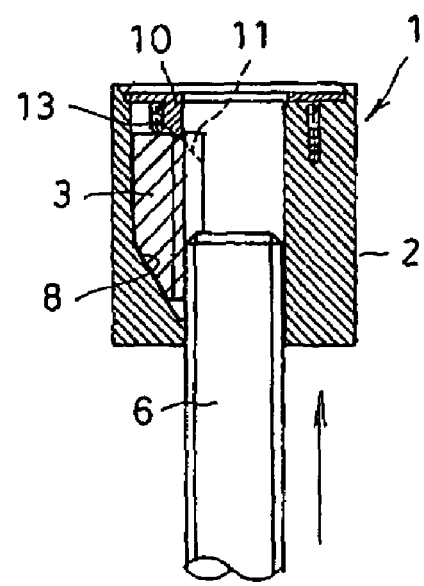
FIG. 14 is a cross-sectional view showing the condition when a bolt is being inserted in Embodiment 3.
Figure 15:
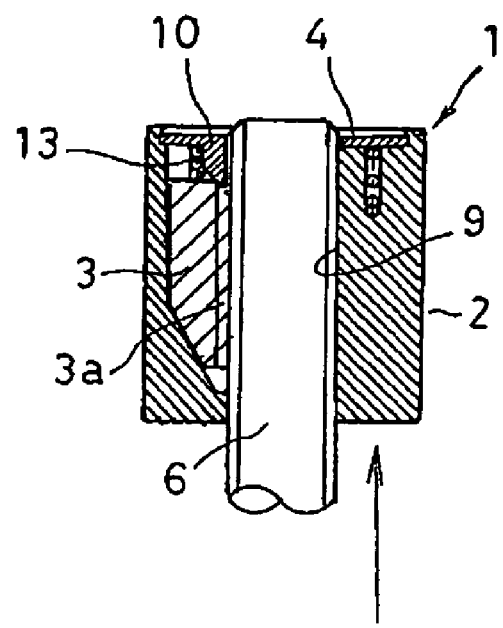
FIG. 15 is a cross-sectional view showing the condition after the bolt has been inserted in Embodiment 3.
Figure 16:
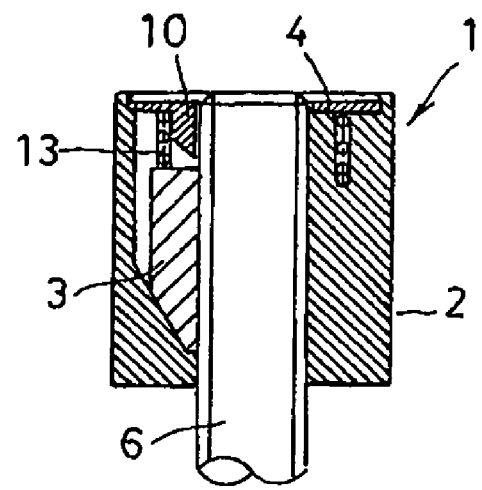
FIG. 16 is a cross-sectional view showing the condition when the running screw is engaged with the bolt of Embodiment 3.
Figure 17:
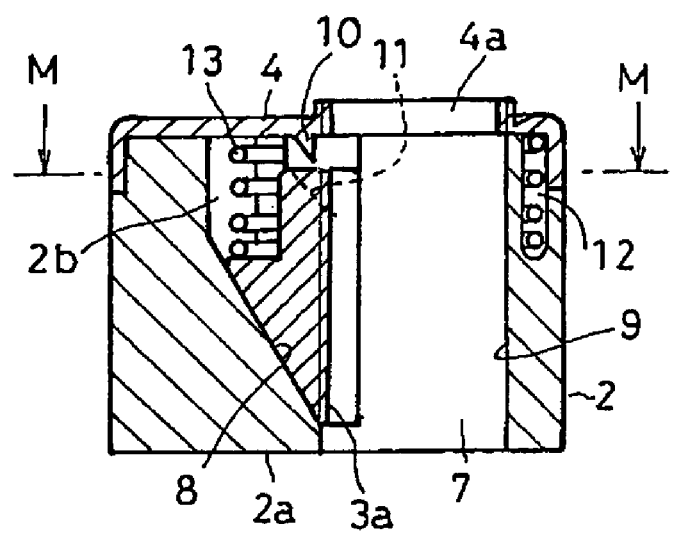
FIG. 17 is an entire cross-sectional view of Embodiment 4.

FIGS. 12 and 13 illustrate the condition before a bolt is inserted into the base 2 in this embodiment, FIG. 14 illustrates the condition while a bolt is being inserted, FIG. 15 illustrates the condition after a bolt has been inserted, and FIG. 16 illustrates the condition when the bolt 6 is returned slightly downward and the female screw 3a of the running screw 3 is engaged with the male screw 6a of the bolt 6. When the bolt 6 is inserted in the base 2, the running screw 3 moves upward along the slope portion 8. Because the guide projection 10 of the cover 4 is engaged with the guide groove 11 of the running screw 3, the running screw 3 can be prevented from inclining or slipping down. Further, because the coil spring 13 presses the running screw 3 downward, the female screw 3a of the running screw 3 can be engaged with the bolt 6. In addition, because the bolt-receiving face 9 of the bolt-insertion hole 7 receives the reaction force from this engagement, the bolt 6 can be securely fastened.

Embodiment 4

Figure 18:
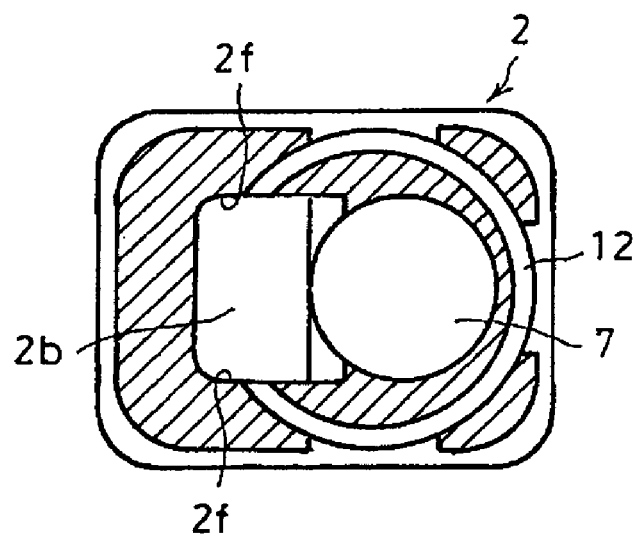
FIG. 18 is a cross-sectional view taken along line M-M in FIG. 17, showing the base in Embodiment 4.

FIGS. 17-20 show Embodiment 4 of the present invention. In this embodiment, the entire device is shaped like a rectangular box. That is to say, the base 2 and the cover 4 are formed so that each has a rectangular outer shape. A coil spring 13 is used as a pressing means for pressing the running screw 3 downward, in the diameter-reducing direction of the running screw 3. To accommodate the coil spring 13, a spring-accommodating groove 12 is formed in the base 2, as shown in FIG. 18.

Figure 19:
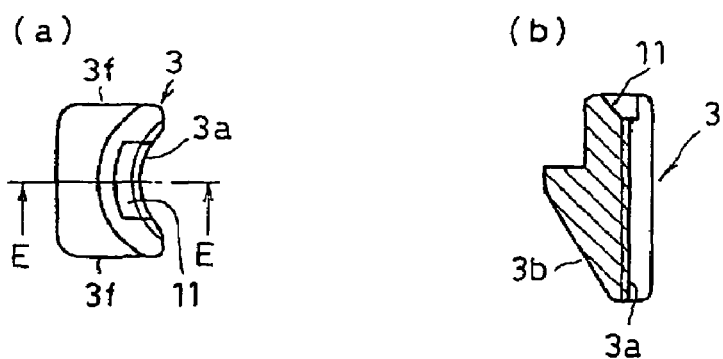
FIG. 19 shows running screws in Embodiment 4.
Figure 20:
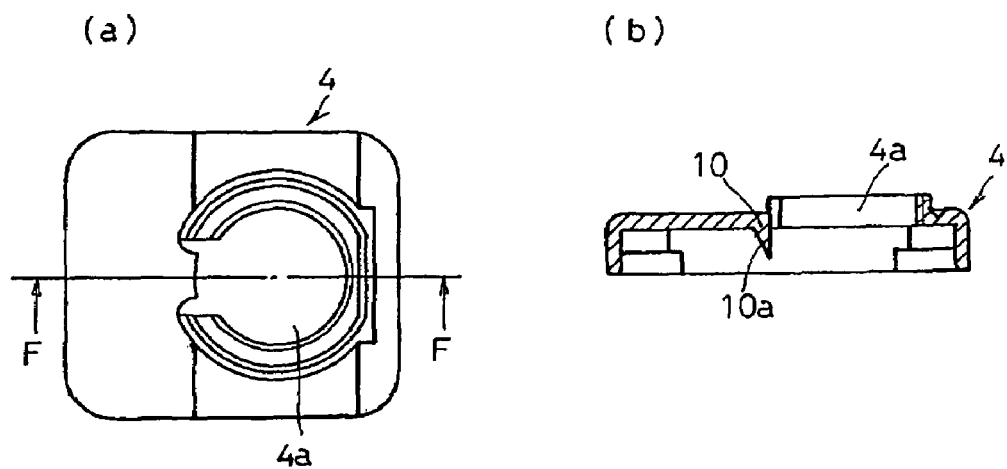
FIG. 20 shows a cover in Embodiment 4.

The running screw 3 is inserted in the base 2 in such a way that a female screw 3a of the screw 3 is opposed to the bolt-receiving face 9. As shown in FIG. 19, the slide face 3b of the running screw 3, which slides along a slide portion 8a of the base 2, is formed on the side opposite to the female screw 3a. A guide groove 11 having a predetermined width is formed as an inclined portion at a central portion of the means for guiding the running screw on the top face of the running screw 3. That is to say, in this embodiment, the guide groove 11 is provided at one portion on the top face of the running screw 3. The guide groove 11 is also inclined in the same direction as that of the slope portion 8 of the base 2.

The guide projection 10 that is engaged with the guide groove 11 of the running screw 3 is formed on the cover 4 at a portion corresponding to the guide groove 11. The guide face 10a, which is inclined in the same direction as the guide groove 11 (i.e., the direction of the slope portion 8 of the base 2) is formed on the guide projection 10, and this guide face 10a engages with the guide groove 11 of the running screw 3.

A groove for the running screw 2b, which enables a running screw 3 to be slideably inserted, is formed on the base 2. As shown in FIG. 18, sidewalls 2f are formed in the groove for the running screw 2b in such a way that the sidewalls 2f correspond to the two side faces 3f of the running screw 3. That is to say, the two side faces 3f of the running screw 3 are parallelly formed in the vertical direction, and the sidewalls 2f of the groove for the running screw 2b extend in the vertical direction like the side faces 3f and parallel to the side faces 3f. Thus, the sidewalls 2f support the side faces 3f of the running screw 3, and therefore the groove for the running screw 2b prevents the running screw 3 from wobbling in the circumferential direction.

In this embodiment, when the bolt 6 is inserted in the bolt-insertion hole 7 from the bolt-insertion face 2a, the running screw 3 moves in the diameter-enlarging direction of the running screw 3 along the slope portion of the base 2. At this time, because the guide projection 10 of the cover 4 engages with the guide groove 11 of the running screw 3, the bolt 6 can be smoothly inserted in the bolt-insertion hole 7 in such a way that the running screw 3 is not inclined toward the bolt-insertion hole 7 and does not slip down. In addition, because the groove for the running screw 2b of the base 2 prevents the running screw 3 from wobbling in the circumferential direction, the running screw 3 meshes even more smoothly with the bolt 6.

Embodiment 5

Figure 21:
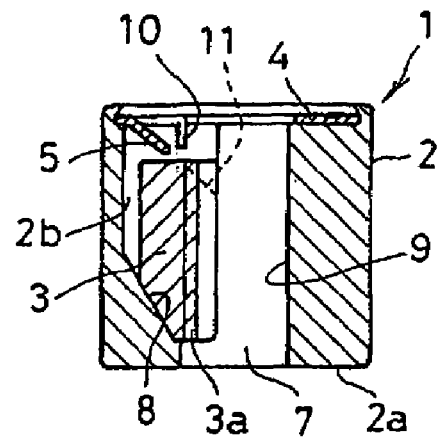
FIG. 21 is a cross-sectional view in Embodiment 5.
Figure 22:
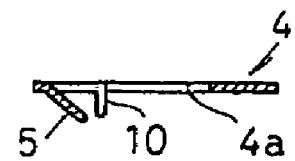
FIG. 22 is a cross-sectional view of a cover in Embodiment 5.

FIGS. 21-24 show Embodiment 5 of the present invention. FIGS. 21 and 22 correspond to Embodiment 1, and FIGS. 23 and 24 correspond to Embodiment 2. That is to say, in the embodiment shown in FIGS. 21 and 22, one running screw 3 is incorporated in the base 2, and the face of the bolt-insertion hole 7 corresponding to the running screw 3 is a bolt-receiving face 9. In contrast, in the embodiment shown in FIG. 23 and FIG. 24, a pair of running screws 3 are incorporated in the base 2.

Figure 23:
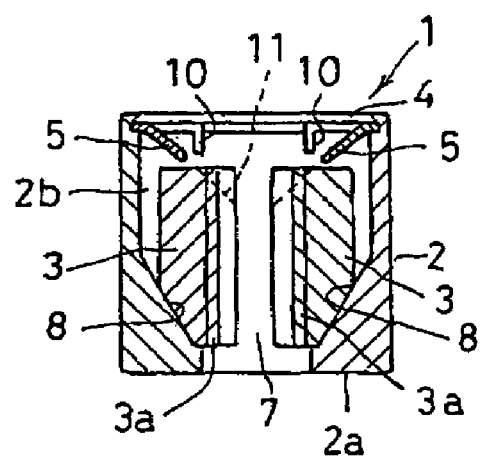
FIG. 23 is an entire cross-sectional view in Embodiment 6.
Figure 24:
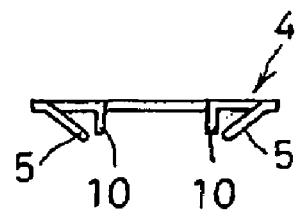
FIG. 24 is a cross-sectional view of a cover in Embodiment 6.
Figure 25:
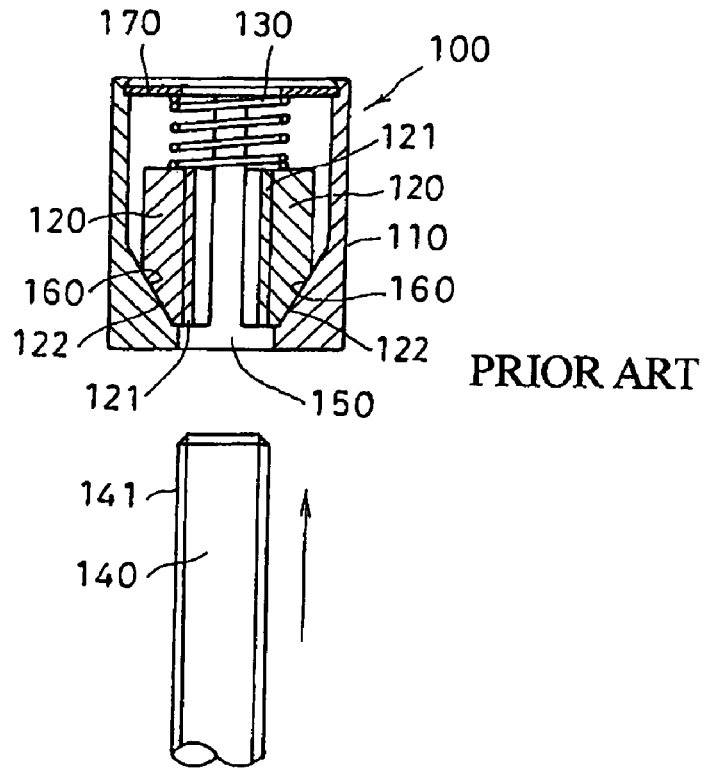
FIG. 25 is a cross-sectional view showing a conventional fastening device.
Figure 26:
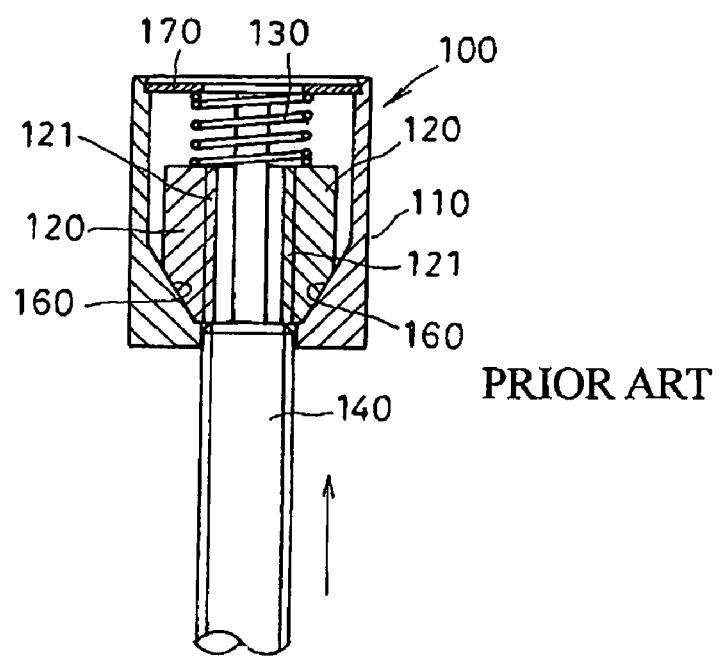
FIG. 26 is a cross-sectional view showing the condition when a bolt is about to be inserted into a conventional fastening device.
Figure 27:
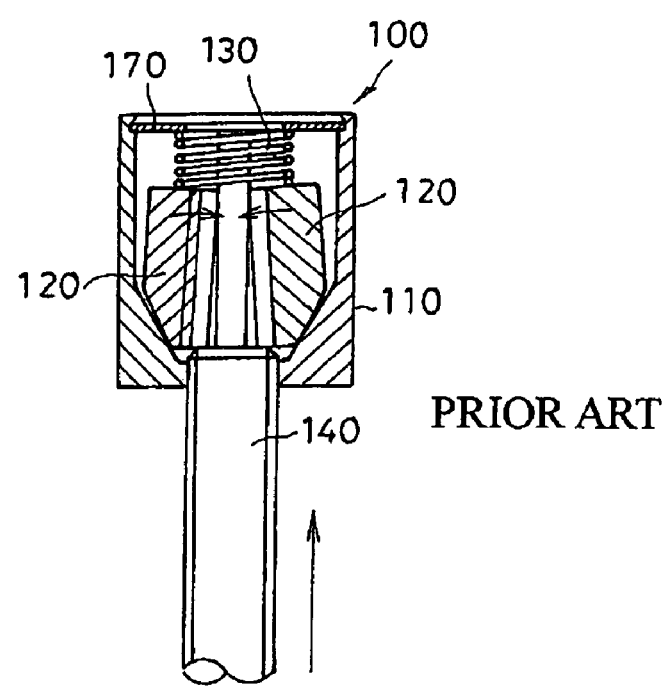
FIG. 27 is a cross-sectional view showing downward of the running screws in a conventional fastening device.

As shown in FIGS. 21 and 23, guide grooves 11, which are inclined in the same direction as the slope portion 8 of the base 2, are formed in the running screws 3. In contrast, the guide projections 10 that constitutes the means for guiding the running screw together with the guide grooves 11 are formed on the cover 4, and these guide projections 10 are pins. Guide projections 10, which are pins, are hung from the cover 4 under the condition that the guide projections 10 are positioned on both sides of the spring piece 5. Each guide projection 10 engages with a guide groove 11 of a running screw 3 when the running screw 3 moves in the diameter-enlarging direction of the running screw 3. This prevents the running screw 3 from inclining or slipping down toward the bolt-insertion hole 7, and thus the bolt 6 can be smoothly inserted in the bolt-insertion hole 7.

Also in Embodiment 5, although not shown, the sidewalls 2f that support both of the side faces 3f of the running screw 3, are formed on the groove for the running screw 2b of the base 2, into which the running screw 3 is inserted, thereby preventing the running screw 3 from wobbling in the circumferential direction.

The present invention is not limited to the above-mentioned embodiments, and it can be modified in various ways. For example, it is necessary only that the means for guiding the running screw be opposite the running screw and the cover, and the inclined portion (the guide groove 11) can be formed on the cover, and the engagement portion (guide projection 10) can be formed on the running screw.

EXPLANATION OF NUMBERS IN THE DRAWINGS

1. Fastening device
2 Base
2a Bolt-insertion face
2b Groove for running screw
2c Cover-attaching concavity
3 Running screw
3a Female screw
3b Slide face
4 Cover
5 Spring piece
6 Bolt
6a Male screw
7 Bolt-insertion hole
8 Slope portion
9 Bolt-receiving face
10 Guide projection
10a Guide face
11 Guide groove
12 Spring-accommodating groove
100 Fastening device
110 Base
120 Running screw
121 Female screw
122 Tapered face
130 Spring
140 Bolt
141 Male screw
150 Bolt-insertion face
160 Slope portion
170 Cover

What is claimed is:

1. A fastening device, comprising:
    (1) a base, comprising
        (a) a bolt-insertion hole whose one portion is a bolt-insertion face, and
        (b) a slope portion whose radius is gradually reduced toward the bolt-insertion face under the condition that it connects with the bolt-insertion hole,
    (2) a running screw, comprising
        (a) a tapered, slide face that slides on said slope portion,
        (b) two lateral faces, and
        (c) an inclined portion that is inclined in the same direction as said slope portion and is formed on an end opposite to the bolt-insertion face, and which slides along said slope portion and is engaged with an inserted bolt, as it moves in its axial direction,
    (3) a pressing member for pressing the running screw downward, toward the bolt-insertion face,
    (4) a cover, on which an engagement portion engageable with the inclined portion of the running screw is formed, in which an insertion hole for inserting said bolt is formed, and which is mounted at the end opposite to the bolt-insertion side of said base,
    (5) a groove for said running screw, which is formed on said base, in which said running screw is slideably inserted, and which supports both of the two lateral faces of the running screw of the inserted running screw so as to prevent said running screw from wobbling in the circumferential direction,
    wherein, when said running screw moves toward said cover due to insertion of a bolt into said base, said engagement portion and said inclined portion become engaged with each other so as to prevent the running screw from slipping in a direction opposite to direction in which the bolt is inserted into said base.

2. The fastening device as set forth in claim 1, wherein said inclined portion is a guide groove that is formed on said running screw, and said engagement portion is a guide projection that is formed on said cover.

3. The fastening device as set forth in claim 2, wherein a guide face, which is inclined in the same direction as said slope portion, is formed on said guide projection, and said guide face is engaged with said guide groove.

4. The fastening device as set forth in claim 2, wherein said guide projection is a pin that projects from said cover toward the running screw, and said pin is engaged with said guide groove.

5. The fastening device as set forth in claim 1, wherein:
    both of the two lateral faces of the running screw of said running screw extend parallel and in a direction which is parallel to an insertion direction of the bolt,
    both of the two sidewalls for receiving the side faces of said running screw are formed on the groove for said running screw of said base, and
    both of the two sidewalls of the groove for said running screw extend parallel in the direction which is parallel to an insertion direction of the bolt.

6. The fastening device as set forth in claim 1, wherein the inclined portion and the engagement portion are separate from each other before a bolt is inserted into said base, and, when said running screw has moved toward said cover due to insertion of the bolt into said base, said engagement portion becomes engaged with said inclined portion so as to prevent the running screw from slipping in a direction opposite to the direction in which the bolt is inserted.

7. The fastening device as set forth in claim 1, wherein said engagement portion and said pressing member are configured on said cover.

8. A fastening device, comprising:
    (1) a base comprising
        (a) a bolt-insertion hole, and
        (b) a plurality of slope portions whose radii are gradually reduced toward a bolt insertion side of said bolt-insertion hole, under the condition that they connect with the bolt-insertion hole,
    (2) a plurality of running screws comprising
        (a) tapered, slide faces that slide on said slope portions,
        (b) two lateral faces, and
        (c) inclined portions that are inclined in the same direction as said slope portions and are formed on ends opposite to the bolt-insertion side, and which slide along said slope portions and are engaged with an inserted bolt, as it moves in its axial direction, (3) a pressing member for pressing the running screws downward, toward the bolt-insertion side, (4) a cover, on which engagement portions engageable with the inclined portions of the running screws are formed, in which an insertion hole for inserting said bolt is formed, and which is mounted at the end opposite to the bolt-insertion side of said base, (5) grooves for respectively receiving one of the running screws, which are formed on said base, in which said running screws are slideably inserted and which supports both of the two lateral faces of the running screws so as to prevent said running screws from wobbling in a circumferential direction, wherein, when said running screws have moved toward said cover due to insertion of a bolt into said base in an insertion direction, said engagement portions and said inclined portions become engaged with each other so as to prevent the running screws from slipping down.

9. The fastening device as set forth in claim 8, wherein a plurality of inclined portions and a plurality of engagement portions are provided to each of the running screws.

* * * * *